US010685252B2

(12) United States Patent
Viswanathan

(10) Patent No.: US 10,685,252 B2
(45) Date of Patent: Jun. 16, 2020

(54) METHOD AND APPARATUS FOR PREDICTING FEATURE SPACE DECAY USING VARIATIONAL AUTO-ENCODER NETWORKS

(71) Applicant: HERE Global B.V., Eindhoven (NL)

(72) Inventor: Anirudh Viswanathan, Berkeley, CA (US)

(73) Assignee: HERE Global B.V., Eindhoven (NL)

(*) Notice: Subject to any disclaimer, the term of this patent is extended or adjusted under 35 U.S.C. 154(b) by 19 days.

(21) Appl. No.: 16/174,892

(22) Filed: Oct. 30, 2018

(65) Prior Publication Data

US 2020/0134354 A1   Apr. 30, 2020

(51) Int. Cl.
*G06K 9/00*   (2006.01)
*G06K 9/46*   (2006.01)
*G06F 17/11*   (2006.01)
*G05D 1/02*   (2020.01)

(52) U.S. Cl.
CPC ......... *G06K 9/4609* (2013.01); *G05D 1/0246* (2013.01); *G06F 17/11* (2013.01); *G06K 9/00798* (2013.01)

(58) Field of Classification Search
None
See application file for complete search history.

(56) References Cited

U.S. PATENT DOCUMENTS

2018/0283892 A1   10/2018   Behrendt et al.

FOREIGN PATENT DOCUMENTS

WO   WO 2018/002910 A1   1/2018

OTHER PUBLICATIONS

Hsu, W-N, et al., *Unsupervised Domain Adaptation for Robust Speech Recognition via Variational Autoencoder-Based data Augmentation*, Research Paper (published Sep. 22, 2017) 8 pages.
Liu, M-Y, et al., *Unsupervised Image-to-Image Translation Networks*, Research Paper (published Feb. 15, 2018) 11 pages.
Revilloud, M. et al., *Generator of Road Marking Textures and Associated Ground Truth Applied to the Evaluation of Road Marking Detection*, Research Paper (Published Sep. 25, 2012) 7 pages.
Zhang, Z. et al., *Age Progression/Regression by Conditional Adversarial Autoencoder*, Research Paper (published Mar. 28, 2017) 9 pages.

(Continued)

*Primary Examiner* — Atiba O Fitzpatrick
(74) *Attorney, Agent, or Firm* — Alston & Bird LLC

(57) ABSTRACT

An apparatus, method and computer program product are provided for predicting feature space decay using variational auto-encoder networks. Methods may include: receiving a first image of a road segment including a feature disposed along the road segment; applying a loss function to the feature of the first image; generating a revised image, where the revised image includes a weathered iteration of the feature; generating a predicted image using interpolation between the image and the revised image of a partially weathered iteration of the feature; receiving a user image, where the user image is received from a vehicle traveling along the road segment; correlating a feature in the user image to the partially weathered iteration of the feature in the predicted image; and establishing that the feature in the user image is the feature disposed along the road segment.

20 Claims, 6 Drawing Sheets

(56) References Cited

OTHER PUBLICATIONS

Extended European Search Report for Application No. 19206026.7 dated Mar. 18, 2020, 13 pages.
Tutorial—What is a Variational Autoencoder?—Jaan Allosaar [online] [retrieved Mar. 3, 2020]. Retrieved via the Internet: https://web.archive.org/web/20180818110913/https://jaan.io/what-is-variational-autoencoder-vae-tutorial/ (dated Aug. 18, 2018) 20 pages.
Bellini, R. et al., *Time-Varying Weathering in Texture Space*, ACM Trans. Graph., vol. 35, No. 4, April 141 (Jul. 2016) 11 pages.
Labayrade, R. et al., *How Autonomous Mapping Can Help a Road Lane Detection System?*, ICARCV (2006) 6 pages.

METHOD AND APPARATUS FOR PREDICTING FEATURE SPACE DECAY USING VARIATIONAL AUTO-ENCODER NETWORKS

TECHNOLOGICAL FIELD

Example embodiments of the present invention relate generally to a perception system of a vehicle such as an autonomous vehicle, specifically one that detects features in an environment that are relevant to autonomous control of the vehicle, and more particularly, to an automated method of re-training a perception module of an autonomous or partially autonomous vehicle to detect the same feature space under different conditions.

BACKGROUND

Road geometry modelling is very useful for three dimensional (3D) map creation and 3D terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern day applications (e.g., 3D mapping, terrain identification, or the like) require the analysis of large amounts of data, and therefore are not practical without quicker or less costly techniques.
Some current methods rely upon feature detection from image data to perform road terrain detection, but these methods have deficiencies. For instance, some systems designed for terrain and feature detection around a vehicle exist, but may be unreliable. Further, the reliability of feature detection may not be known such that erroneous feature detection or lack of feature detection may adversely impact autonomous or semi-autonomous driving. Over-estimating the accuracy of feature detection may cause accuracy issues as object locations may be improperly interpreted as accurate when they are actually inaccurate, while under-estimating accuracy may lead to inefficiencies through overly cautious behaviors. Further, features may change over time and autonomous vehicles need to be able to properly detect and interpret features over varying states of decay.

BRIEF SUMMARY

Accordingly, a method, apparatus, and computer program product are provided for training a system to project feature decay using a variational autoencoder network to discover the latent space spanned by feature decay. The parameters of the network learn an implicit transformation, allowing interpolation of the feature-space decay from a single new image.
Embodiments described herein may provide an apparatus to facilitate autonomous or semi-autonomous control of a vehicle including at least one non-transitory memory including computer program code instructions stored thereon. The program code instructions may be configured to, when executed, cause the apparatus to at least: receive a first image of a road segment including a feature disposed along the road segment; apply a loss function to the feature of the first image; generate a revised image, where the revised image includes a weathered iteration of the feature; generate a predicted image using interpolation between the image and the revised image of a partially weathered iteration of the feature; receive a user image, where the user image may be received from a vehicle traveling along the road segment; correlate a feature in the user image to the partially weathered iteration of the feature in the predicted image; establish that the feature in the user image is the feature disposed along the road segment; and facilitate autonomous control of the vehicle based, at least in part, on the feature in the user image in response to the feature in the user image being established as the feature disposed along the road segment.

The loss function may include a negative log-likelihood function. The apparatus of example embodiments may be caused to: receive training data including a plurality of training images of a sample road segment and at least one sample feature thereon, where the plurality of training images are temporally spaced apart by a predetermined amount of time; and where generating a revised image including a weathered iteration of the feature includes generating a revised image based, at least in part, on information learned from the training data. The apparatus may optionally be caused to: receive a new image of the road segment including the feature disposed along the road segment, where the new image is received at least a predefined period of time after the first image; correlating the feature of the new image with the partially weathered iteration of the feature in the predicted image; and revise the loss function based on a difference between the feature of the new image and the partially weathered iteration of the feature in the predicted image.

The first feature may be a lane line, where causing the apparatus to facilitate autonomous control of the vehicle based, at least in part, on the feature in the user image in response to the feature in the user image being established as the feature disposed along the road segment includes causing the apparatus to provide for autonomous control of the vehicle within a lane of the road segment bordered by the lane line. Causing the apparatus to receive a first image of a road segment may include causing the apparatus to receive the first image of the road segment and process the first image using a perception module to identify the feature disposed along the road segment. The first image may be received from a sensor of an autonomous vehicle traveling along the road segment.

Embodiments described herein may provide a computer program product including at least one non-transitory computer-readable storage medium having computer-executable program code instructions stored therein. The computer-executable program code instructions may include program code instructions to: receive a first image of a road segment including a feature disposed along the road segment; apply a loss function to the feature of the first image; generate a revised image, where the revised image includes a weathered iteration of the feature; generate a predicted image using interpolation between the image and the revised image of a partially weathered iteration of the feature; receive a user image, where the user image is received from a vehicle traveling along the road segment; and facilitate autonomous control of the vehicle based, at least in part, on the feature in the user image in response to the feature in the user image being established as the feature disposed along the road segment.

The loss function may include a negative log-likelihood function. The computer program product of some embodiments may include program code instructions to: receive training data including a plurality of training images of a sample road segment and at least one sample feature thereon, where the plurality of training images may be temporally spaced apart by a predetermined amount of time;

and where generating a revised image including a weathered iteration of the feature includes generating a revised image based, at least in part, on information learned from the training data. Embodiments of the computer program product may include program code instructions to: receive a new image of the road segment including the feature disposed along the road segment, where the new image may be received at least a predefined period of time after the first image; correlate the feature of the new image with the partially weathered iteration of the feature in the predicted image; and revise the loss function based on a difference between the feature of the new image and the partially weathered iteration of the feature in the predicted image.

According to some embodiments, the first feature may be a lane line, where the program code instructions to facilitate autonomous control of the vehicle based, at least in part, on the feature in the user image in response to the feature in the user image being established as the feature disposed along the road segment includes program code instructions to provide for autonomous control of the vehicle within a lane of the road segment bordered by the lane line. The program code instructions to receive a first image of a road segment including a feature disposed along the road segment may include program code instructions to receive the first image of the road segment and process the first image using a perception module to identify the feature disposed along the road segment. The first image is received from a sensor of an autonomous vehicle traveling along the road segment.

Embodiments described herein may provide a method including: receiving a first image of a road segment including a feature disposed along the road segment; applying a loss function to the feature of the first image; generating a revised image, where the revised image includes a weathered iteration of the feature; generating a predicted image using interpolation between the image and the revised image of a partially weathered iteration of the feature; receiving a user image, where the user image is received from a vehicle traveling along the road segment; correlating a feature in the user image to the partially weathered iteration of the feature in the predicted image; establishing that the feature in the user image is the feature disposed along the road segment; and facilitating autonomous control of the vehicle based, at least in part, on the feature in the user image in response to the feature in the user image being established as the feature disposed along the road segment.

The loss function may include a negative log-likelihood function. Methods may include: receiving training data including a plurality of training images of a sample road segment and at least one sample feature therein, where the plurality of training images are temporally spaced apart by at least a predetermined amount of time; and where generating a revised image including a weathered iteration of the feature includes generating a revised image based, at least in part, on information learned from the training data. Methods may include receiving a new image of the road segment including the feature disposed along the road segment, where the new image is received at least a predefined period of time after the first image; correlating the feature of the new image with the partially weathered iteration of the feature in the predicted image; and revising the loss function based on a difference between the feature of the new image and the partially weathered iteration of the feature in the predicted image. The first feature may be a lane line, where facilitating autonomous control of the vehicle based, at least in part, on the feature in the user image in response to the feature in the user image being established as the feature disposed along the road segment may include providing for autonomous control of the vehicle within a lane of the road segment bordered by the lane line. Receiving a first image of a road segment including a feature disposed along the road segment may include receiving the first image of the road segment and processing the first image using a perception module to identify the feature disposed along the road segment.

Embodiments described herein may provide an apparatus including: means for receiving a first image of a road segment including a feature disposed along the road segment; applying a loss function to the feature of the first image; means for generating a revised image, where the revised image includes a weathered iteration of the feature; means for generating a predicted image using interpolation between the image and the revised image of a partially weathered iteration of the feature; means for receiving a user image, where the user image is received from a vehicle traveling along the road segment; means for correlating a feature in the user image to the partially weathered iteration of the feature in the predicted image; means for establishing that the feature in the user image is the feature disposed along the road segment; and means for providing for autonomous control of the vehicle based, at least in part, on the feature in the user image in response to the feature in the user image being established as the feature disposed along the road segment.

The loss function may include a negative log-likelihood function. The apparatus may include: means for receiving training data including a plurality of training images of a sample road segment and at least one sample feature therein, where the plurality of training images are temporally spaced apart by at least a predetermined amount of time; and where the means for generating a revised image including a weathered iteration of the feature includes means for generating a revised image based, at least in part, on information learned from the training data. The apparatus of example embodiments may include: means for receiving a new image of the road segment including the feature disposed along the road segment, where the new image is received at least a predefined period of time after the first image; means for correlating the feature of the new image with the partially weathered iteration of the feature in the predicted image; and means for revising the loss function based on a difference between the feature of the new image and the partially weathered iteration of the feature in the predicted image. The first feature may be a lane line, where the means for providing for autonomous control of the vehicle based, at least in part, on the feature in the user image in response to the feature in the user image being established as the feature disposed along the road segment may include means for providing for autonomous control of the vehicle within a lane of the road segment bordered by the lane line. The means for receiving a first image of a road segment including a feature disposed along the road segment may include means for receiving the first image of the road segment and processing the first image using a perception module to identify the feature disposed along the road segment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
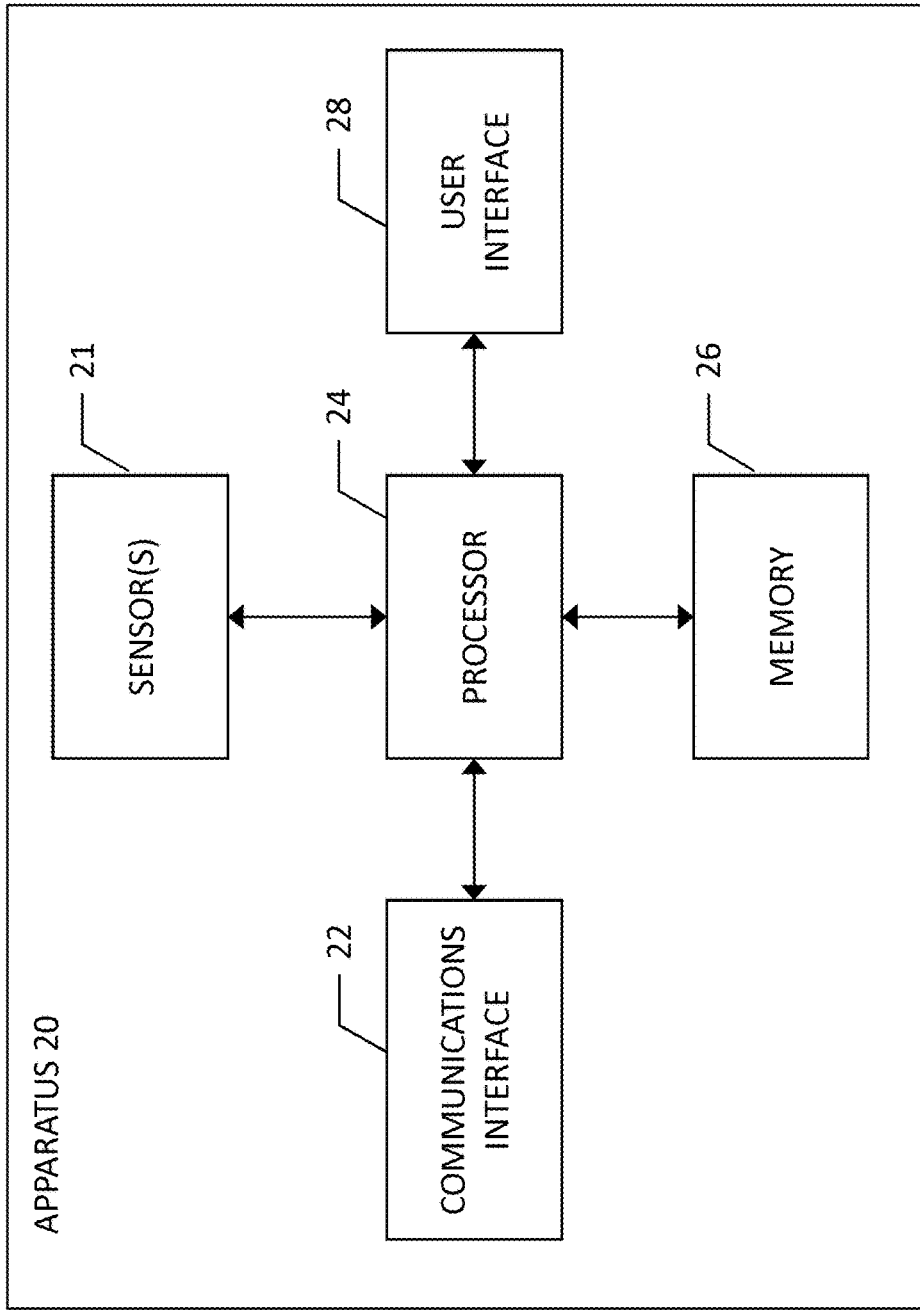
Figure 2:
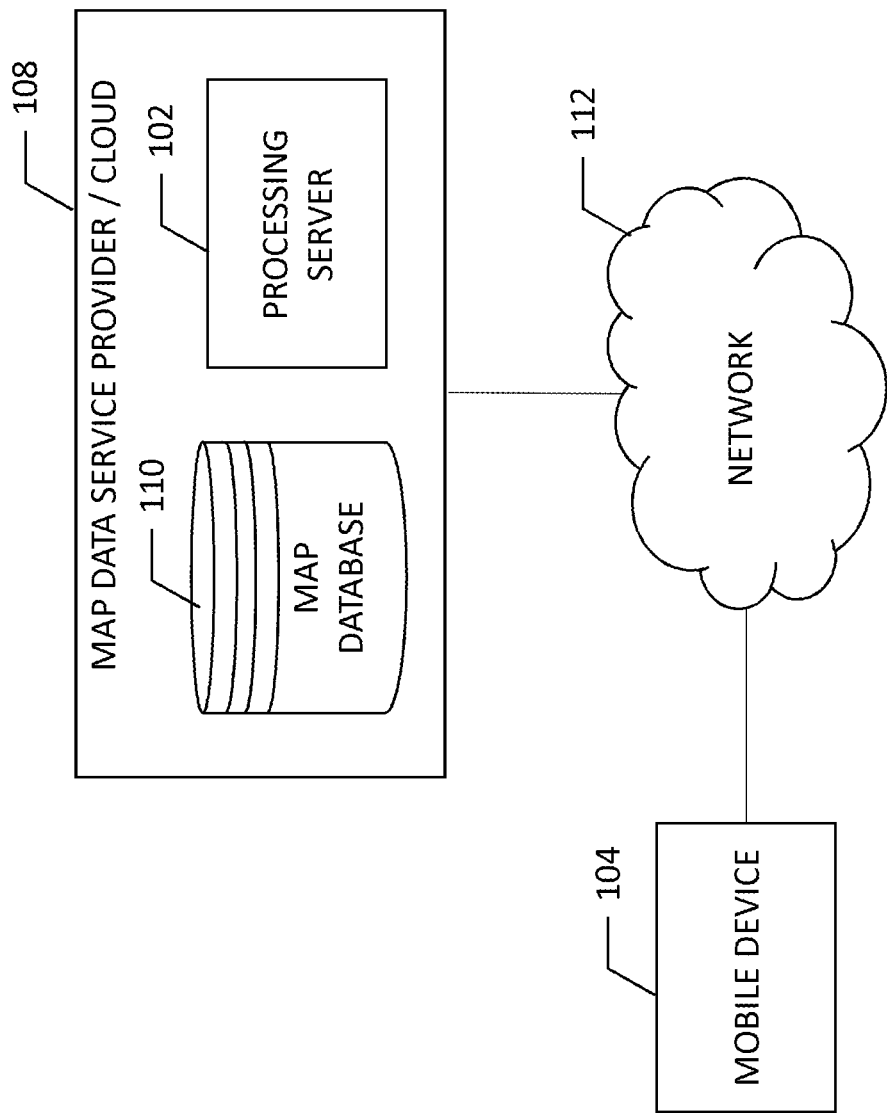
Figure 3:
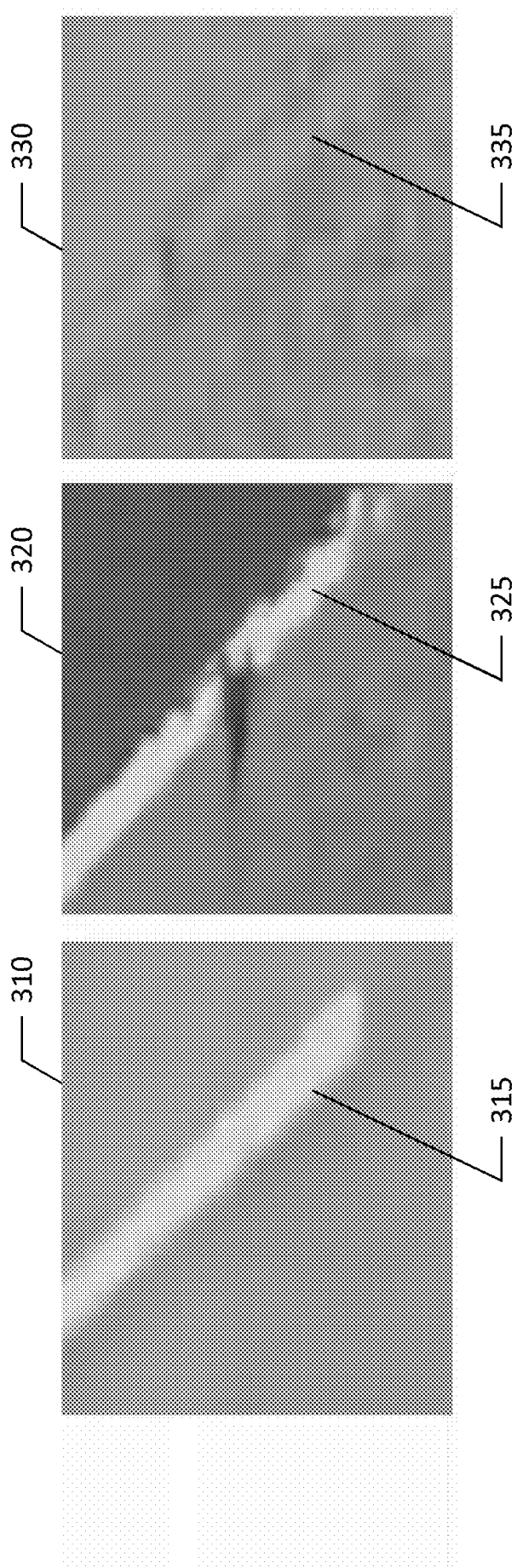
Figure 4:
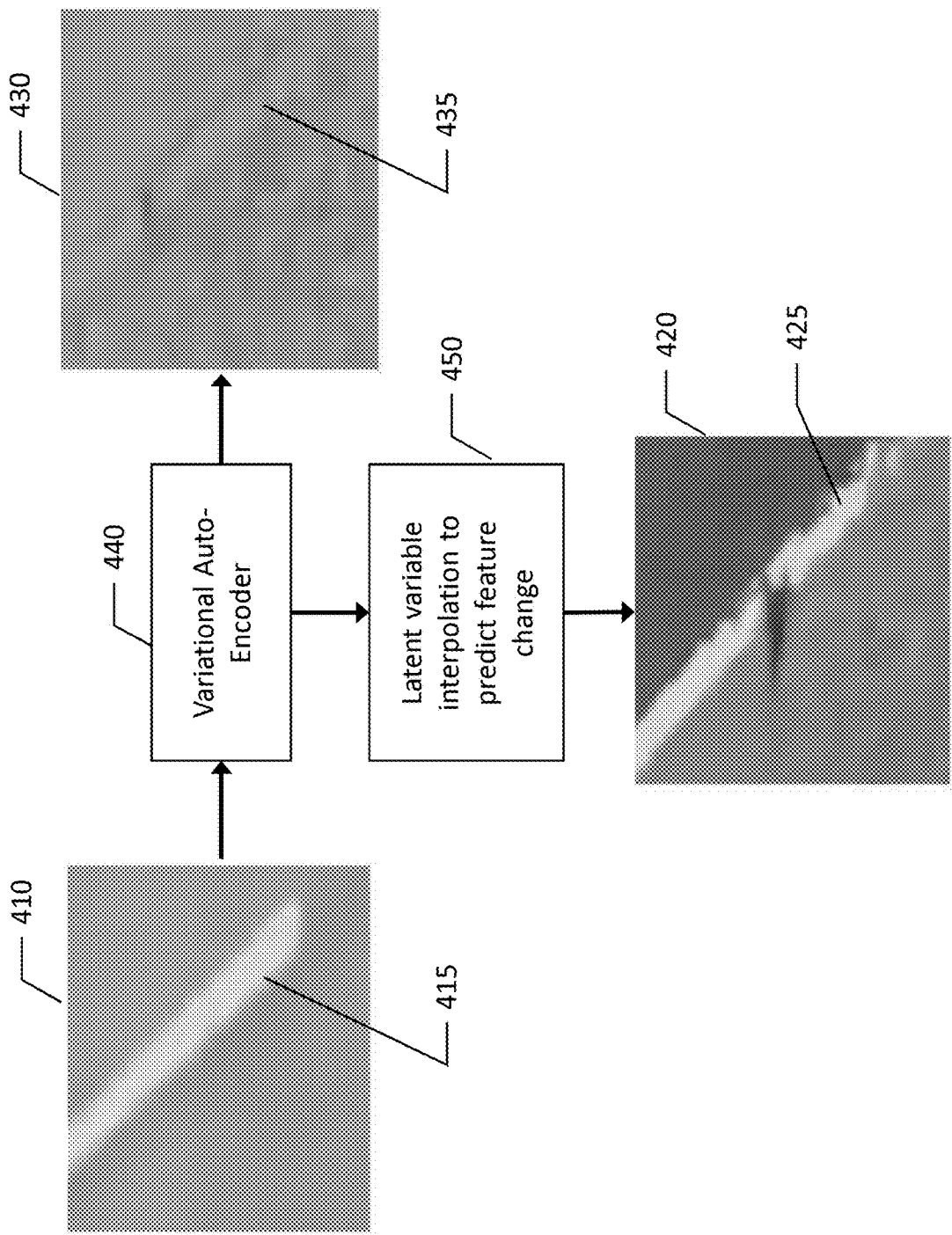
Figure 5:
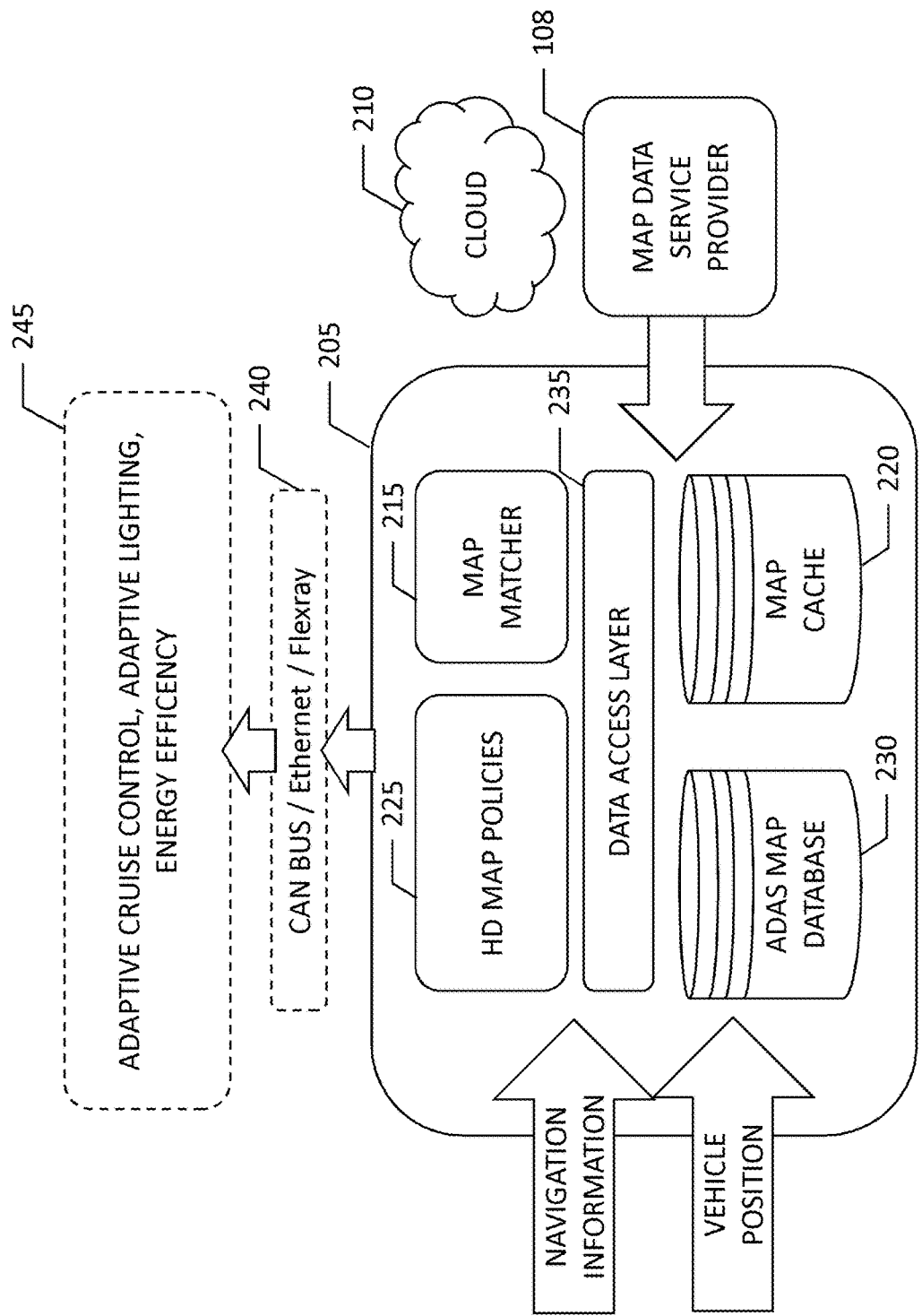
Figure 6:
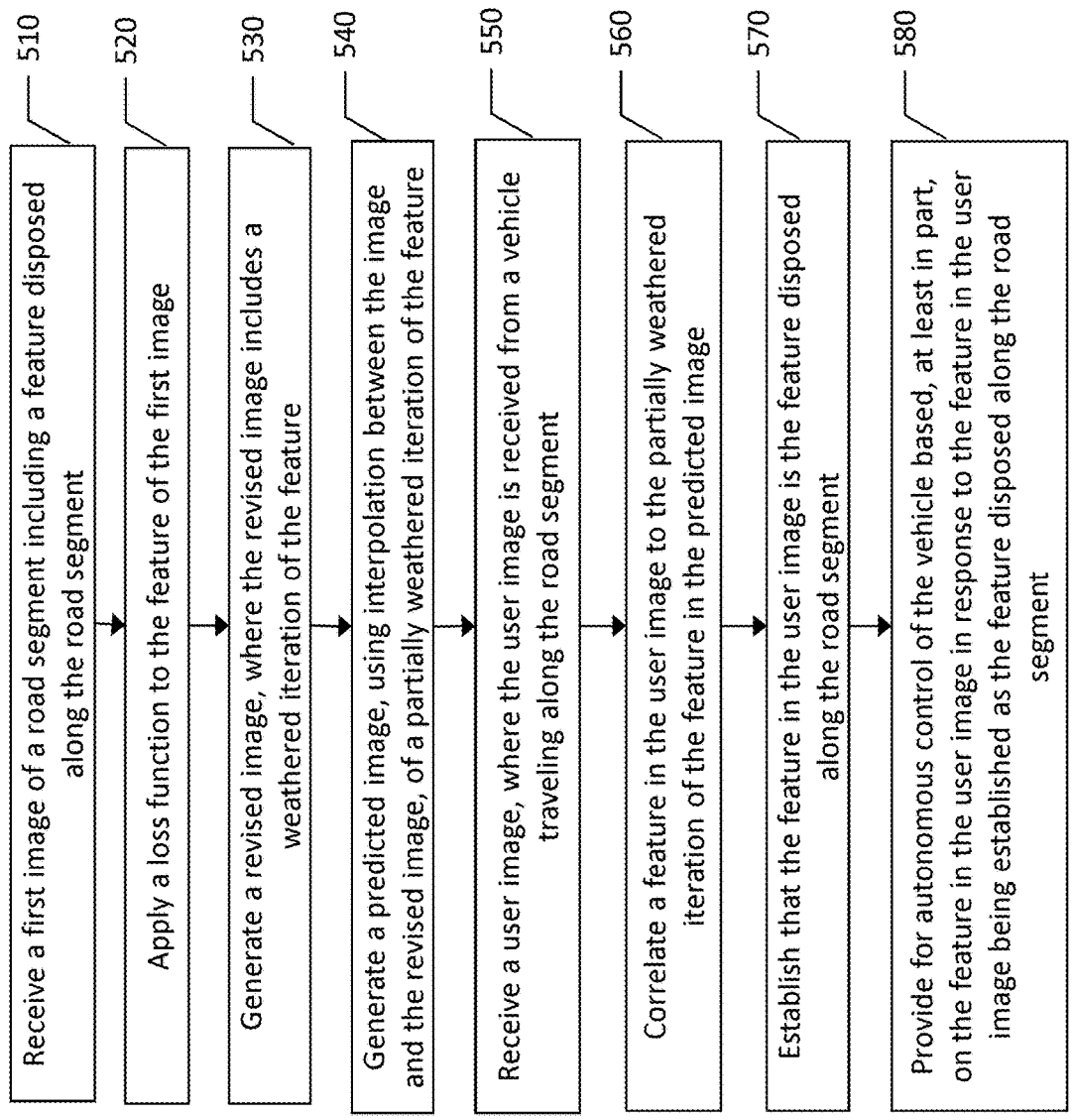

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for estimating interpolation of feature-space decay from a single new image according to an example embodiment of the present disclosure;

FIG. 3 depicts feature space decay for a sample feature according to an example embodiment of the present disclosure;

FIG. 4 is a block diagram of a process for encoding a weathered feature through the variational auto-encoder and interpolating to predict a partially weathered feature according to an example embodiment of the present disclosure;

FIG. 5 is a block diagram of a system for implementing the methods described herein for predicting feature space decay of a feature according to an example embodiment of the present disclosure; and FIG. 6 is a flowchart of operations for predicting feature space decay using variational auto-encoder networks according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for estimating, through interpolation, feature space decay from a single new image. Autonomous vehicles, as described further below, may rely upon feature detection of features along a road segment along which the vehicle is traveling. Feature detection may be critical in autonomous driving to understand the environment of the vehicle and to safely control the vehicle as it navigates along the road segments. High definition (HD) maps may help in this manner by providing replications of the road segments as detected by sensors having previously traveled along the road segment. However, it is also necessary for the autonomous vehicle to understand its position relative to the features of the HD map and to detect features that may be dynamic or variable in nature that may not be represented by the HD map. An issue in detecting features along a road segment may include feature decay where a feature may be prominent when new, but may deteriorate over time. For example, lines of a road segment may be easily distinguishable when freshly painted, while road lines that are several years old may have weathered due to vehicle traffic, weather, road treatment (e.g., salt, brine, snow plows, etc.) and may not be nearly as distinguishable as when new. Similarly, road signs may deteriorate over time, or may be obscured by encroaching growth such as vines or tree branches that may obscure some or all of the information of a road sign.

Embodiments described herein provide a mechanism for detecting features in the environment that are relevant to the navigation or autonomous driving use-case. Features relevant to driving, such as lane lines, road surface markings, and signs, are detected by a perception system of a vehicle traveling along a road segment to help the vehicle understand the context of the environment in which the vehicle is currently operating. Embodiments describe an automated method and system to explore the latent space of feature-decay as relevant to re-training the perception module of an on-board autonomous vehicle to detect the same feature space repeatably and reliably under different conditions.

HD maps have a high precision at resolutions that may be down to several centimeters to identify objects proximate a road segment, features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly. The sensors may provide sensed data to a perception module or detection module as described further below to determine features of the environment in which the vehicle is traveling.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment. As described above, features may deteriorate over time such that recognition of the features and accurately correlating detected features with existing features of an HD map may be difficult.

Embodiments described herein may benefit both the building of maps such as HD maps and the facilitation of autonomous vehicle control. The building of HD maps may include using detected features to identify new features of a road segment, to confirm existing features of a road segment, and to identify weathered or deteriorated features over time. The HD maps that are built and updated may be used to provide navigation assistance to a user (e.g., a driver of a vehicle) and to facilitate autonomous vehicle control. Further, the ability to accurately detect features that are weathered or diminished may be beneficial to autonomous vehicle control in real-time as a vehicle travels along a road segment.

Perception systems including perception or detection modules of a vehicle and/or of a mapping services provider may use machine learning to train the perception system to recognize features and objects in an environment. In order to train a perception system for an autonomous vehicle, large volumes of data may be needed to be collected under different environmental conditions. Gathering such data may be challenging particularly to collect data that may represent the entire life-cycle of an observed feature or object. Generally, such a data set for a feature such as lane lines needs to include data collected from the same regions under various stages of decay. Stages include when the lane line paint is fresh, slight weathering of the lane line, and fully weathered lane lines, rendering the lane lines nearly invisible. Practical constraints may preclude such data collection efforts and typically the data collected may be a consolidation of different weathered lane lines to cover typical feature decay patterns. Embodiments described herein include a method to programmatically infer the latent space spanned by the decay patterns using a generative adversarial network to predict feature decay.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The processor 24 may function as a perception module or detection module to interpret the sensor data from sensor(s) 21. The perception/detection module may be a separate module from the processor 24, but may perform functions that interpret data from the sensors to identify features within the environment of the sensors. Optionally, as described further below, the perception module or detection module may be located remotely from the apparatus 20 where sensor data may be provided to the perception/detection module which may be part of a map services provider system configured to interpret the sensor data for identifying features and objects sensed by the sensors.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over various wireless communication protocols including Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication or may alternatively support vehicle to vehicle or vehicle to infrastructure wireless links.

The apparatus 20 may support a mapping or navigation application so as to present maps or otherwise provide navigation or driver assistance facilitated by the advanced feature identification methods described herein. For example, the apparatus 20 may provide for display of a map and/or instructions for following a route within a network of roads via user interface 28. In order to support a mapping application, the apparatus may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways using the HD maps that are generated and updated according to the example embodiments described herein. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to road ways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

While crowd-sourced data may help with map building and maintaining fresh map data, the crowd-sourced data may still fall short of providing an accurate portrayal of feature decay over the life span of an observed feature. As such, embodiments described herein may interpolate the feature-space decay from a single, new image. This may enable HD maps to more readily correlate crowd sourced data with data in the HD map, such as when a feature is detected by a vehicle in a state of decay that is substantially different than the same feature in the HD map, embodiments of the present invention may facilitate recognition of the feature as having decayed and thus provide more accurate map matching of the detected feature with the HD map.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, road information/warning signs, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving is vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, pot holes, etc.) and temporary road changes, such as may be caused by construction.

Further, in order to implement full autonomy for a vehicle, the vehicle must be contextually aware in that the vehicle must be aware of the surroundings in terms of both dynamic conditions (e.g., weather, traffic, construction) and static conditions (e.g., road geometry, lane lines, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment. Embodiments described herein may detect features in an environment despite various stages of decay of the feature based on interpolation of the feature space decay from an original image.

As described above, maps such as HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. As such, proper detection of features is critical, regardless of the state of decay of the individual features.

Embodiments of the present disclosure use a variational auto-encoder network to discover the latent space spanned by feature decay. The parameters of the network learn an implicit transformation, allowing interpolation of the feature space decay from a single new image. This helps augment training data for a perception or detection system since the entire feature decay space from a single image can be used to train the perception/detection system.

The standard architecture of the variational auto-encoder network may be used to simulate feature decay. The loss function that may be used in the network may include a negative log-likelihood function. To train the network, a dataset including training data collected a predetermined time apart (e.g., months) from the same location may be fed to the network to create a neural network or to facilitate machine learning. Such a neural network or machine learning results in a system capable of receiving an input of an image with features that are "new" and output features that appear "weathered", which may minimize the loss from actual images of the weathered features. The latent variable for a new input image can be interpolated to span the entire feature decay space and to generate new data to re-train the perception system.

FIG. 3 illustrates an example embodiment of feature space decay for a sample feature. According to the illustrated embodiment, an image 310 is captured by an image sensor of an environment of the sensor. The environment of the sensor is a roadway, and the detected feature is a lane line 315 that is or appears to be new or fresh. Over time, the feature becomes weathered and worn. Image 320 illustrates a partial decay of the feature 325 through weathering, while image 330 illustrates total decay of the feature 335. All three images correspond to the same location at different times.

The processor functioning as a feature detector, such as in a perception module as described herein can detect the features 315, 325, and 335 of images 310, 320, and 330, respectively as the variational auto-encoder interpolates from a new feature 315 through total decay of a feature 335 in order to detect the feature throughout its life cycle. FIG. 4 provides a visualization of an example embodiment described herein. As shown, an input feature is received from image 410 including feature 415 which is a new or fresh lane line. The variational auto-encoder 440 of example embodiments can simulate decay of the feature to produce feature 435 in image 430. Latent variable interpolation 450 between the new feature 415 and the decayed feature 435 enables example embodiments to predict various stages of feature decay such as feature 425 in a state of decay, but not yet fully decayed as in image 430.

Embodiments of the apparatus described herein may further provide for machine learning of the accuracy of the predicted feature decay and for modifying feature decay predictions responsive to observations of features in various stages of decay. For example, a feature that is initially observed as new, processed through the variational auto-encoder using the loss function to produce an encoded representation of a weathered feature with the appearance of the feature is predicted at various stages of decay based on latent variable interpolation, may be actually observed by a sensor of a vehicle as it travels the road segment at a point in time at least some predefined time after the initial observation. The captured observation by a sensor of the partially weathered feature may be compared against the predicted feature decay to establish an accuracy of the latent variable interpolation that predicts feature change. If the observed feature is accurately represented by the interpolation, the interpolation may be unchanged. However, if there is substantial discrepancy, such as a discrepancy that exceeds a predefined threshold, between the observed feature and the interpolated feature that is partially weathered, the interpolation may be revised and the loss function may be updated to reflect the actual decay of the feature.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a reliable manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

According to example embodiments described herein, the role of HD maps in facilitating autonomous or semi-autonomous vehicle control may include interpreting objects sensed by the sensors of a vehicle based on prior observations. When the features observed by a vehicle traveling along a road segment differ from an original observation of a feature, it may be advantageous to understand how the feature may change over time, such as the weathering and decay described above. Predicting this weathering and decay through reliable and repeatable methods as described herein may enable autonomous vehicles to more readily and efficiently correlate observed features along a road segment to those stored in the HD maps. Thus, more accurate autonomous control of a vehicle along the road segment may be possible.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith.

FIG. 5 illustrates an example embodiment of an architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing means and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

FIG. 6 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 is a flowchart of a method for iteratively establishing a feature position within three-dimensional space. As shown, a first image of a road segment is received at 510 including a feature disposed along the road segment. A loss function is applied at 520 to the image or the feature within the image. At 530, a revised image is generated that includes a weathered iteration of the feature. A predicted image is generated at 540, using interpolation between the image and the revised image, of a partially weathered iteration of the feature. A user image is received at 550 from a vehicle traveling along the road segment. A feature in the user image is correlated to the partially weathered iteration of the feature in the predicted image at 560. It is established at 570 that the feature in the user image is the feature disposed along the road segment. At 580, autonomous control of the vehicle is provided based, at least in part, on the feature in the user image being established as the feature disposed along the road segment.

In an example embodiment, an apparatus for performing the method of FIG. 6 above may comprise a processor (e.g., the processor 24) and/or the auto-encoder configured to perform some or each of the operations (510-580) described above. The processor may, for example, be configured to perform the operations (510-580) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-580 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions stored thereon, the computer program code instructions configured to, when executed, cause the apparatus to at least:

receive a first image of a road segment comprising a feature disposed along the road segment;

apply a loss function to the feature of the first image;

generate a revised image, wherein the revised image comprises a weathered iteration of the feature;

generate a predicted image, using interpolation between the image and the revised image, of a partially weathered iteration of the feature;

receive a user image, wherein the user image is received from a vehicle traveling along the road segment;

correlate a feature in the user image to the partially weathered iteration of the feature in the predicted image;

establish that the feature in the user image is the feature disposed along the road segment; and facilitate autonomous control of the vehicle based, at least in part, on the feature in the user image in response to the feature in the user image being established as the feature disposed along the road segment.

2. The apparatus of claim 1, wherein the loss function comprises a negative log-likelihood function.

3. The apparatus of claim 1, wherein the apparatus is further caused to:

receive training data comprising a plurality of training images of a sample road segment and at least one sample feature thereon, wherein the plurality of training images are temporally spaced apart by at least a predetermined amount of time; and wherein generating a revised image comprising a weathered iteration of the feature comprises generating a revised image based, at least in part, on information learned from the training data.

4. The apparatus of claim 1, wherein the apparatus is further caused to:

receive a new image of the road segment comprising the feature disposed along the road segment, wherein the new image is received at least a predefined period of time after the first image;

correlating the feature of the new image with the partially weathered iteration of the feature in the predicted image; and revise the loss function based on a difference between the feature of the new image and the partially weathered iteration of the feature in the predicted image.

5. The apparatus of claim 1, wherein the first feature is a lane line, wherein causing the apparatus to facilitate autonomous control of the vehicle based, at least in part, on the feature in the user image in response to the feature in the user image being established as the feature disposed along the road segment comprises causing the apparatus to provide for autonomous control of the vehicle within a lane of the road segment bordered by the lane line.

6. The apparatus of claim 1, wherein causing the apparatus to receive a first image of a road segment comprising a feature disposed along the road segment comprises causing the apparatus to receive the first image of the road segment, and process the first image using a perception module to identify the feature disposed along the road segment.

7. The apparatus of claim 1, wherein the first image is received from a sensor of an autonomous vehicle traveling along the road segment.

8. A computer program product comprising at least one non-transitory computer-readable storage medium having computer-executable program code instructions stored therein, the computer-executable program code instructions comprising program code instructions to:
receive a first image of a road segment comprising a feature disposed along the road segment;
apply a loss function to the feature of the first image;
generate a revised image, wherein the revised image comprises a weathered iteration of the feature;
generate a predicted image using interpolation between the image and the revised image of a partially weathered iteration of the feature;
receive a user image, wherein the user image is received from a vehicle traveling along the road segment;
correlate a feature in the user image to the partially weathered iteration of the feature in the predicted image;
establish that the feature in the user image is the feature disposed along the road segment; and
facilitate autonomous control of the vehicle based, at least in part, on the feature in the user image in response to the feature in the user image being established as the feature disposed along the road segment.

9. The computer program product of claim 8, wherein the loss function comprises a negative log-likelihood function.

10. The computer program product of claim 8, further comprising program code instructions to:
receive training data comprising a plurality of training images of a sample road segment and at least one sample feature thereon, wherein the plurality of training images are temporally spaced apart by at least a predetermined amount of time; and
wherein generating a revised image comprising a weathered iteration of the feature comprises generating a revised image based, at least in part, on information learned from the training data.

11. The computer program product of claim 8, further comprising program code instructions to:
receive a new image of the road segment comprising the feature disposed along the road segment, wherein the new image is received at least a predefined period of time after the first image;
correlate the feature of the new image with the partially weathered iteration of the feature in the predicted image; and
revise the loss function based on a difference between the feature of the new image and the partially weathered iteration of the feature in the predicted image.

12. The computer program product of claim 8, wherein the first feature is a lane line, wherein the program code instructions to facilitate autonomous control of the vehicle based, at least in part, on the feature in the user image in response to the feature in the user image being established as the feature disposed along the road segment comprises program code instructions to provide for autonomous control of the vehicle within a lane of the road segment bordered by the lane line.

13. The computer program product of claim 8, wherein the program code instructions to receive a first image of a road segment comprising a feature disposed along the road segment comprises program code instructions to receive the first image of the road segment, and process the first image using a perception module to identify the feature disposed along the road segment.

14. The computer program product of claim 8, wherein the first image is received from a sensor of an autonomous vehicle traveling along the road segment.

15. A method comprising:
receiving a first image of a road segment comprising a feature disposed along the road segment;
applying a loss function to the feature of the first image;
generating a revised image, wherein the revised image comprises a weathered iteration of the feature;
generating a predicted image using interpolation between the image and the revised image of a partially weathered iteration of the feature;
receiving a user image, wherein the user image is received from a vehicle traveling along the road segment;
correlating a feature in the user image to the partially weathered iteration of the feature in the predicted image;
establishing that the feature in the user image is the feature disposed along the road segment; and
facilitating autonomous control of the vehicle based, at least in part, on the feature in the user image in response to the feature in the user image being established as the feature disposed along the road segment.

16. The method of claim 15, wherein the loss function comprises a negative log-likelihood function.

17. The method of claim 15, further comprising:
receiving training data comprising a plurality of training images of a sample road segment and at least one sample feature thereon, wherein the plurality of training images are temporally spaced apart by at least a predetermined amount of time; and
wherein generating a revised image comprising a weathered iteration of the feature comprises generating a revised image based, at least in part, on information learned from the training data.

18. The method of claim 15, further comprising:
receiving a new image of the road segment comprising the feature disposed along the road segment, wherein the new image is received at least a predefined period of time after the first image;
correlating the feature of the new image with the partially weathered iteration of the feature in the predicted image; and
revising the loss function based on a difference between the feature of the new image and the partially weathered iteration of the feature in the predicted image.

19. The method of claim 15, wherein the first feature is a lane line, wherein facilitating autonomous control of the vehicle based, at least in part, on the feature in the user image in response to the feature in the user image being established as the feature disposed along the road segment comprises providing for autonomous control of the vehicle within a lane of the road segment bordered by the lane line.

20. The method of claim 15, wherein receiving a first image of a road segment comprising a feature disposed along the road segment comprises receiving the first image of the road segment, and processing the first image using a perception module to identify the feature disposed along the road segment.

* * * * *